G. H. Mallary,
Sawing Shingles.
N° 17,104.
Patented Apr. 21, 1857.
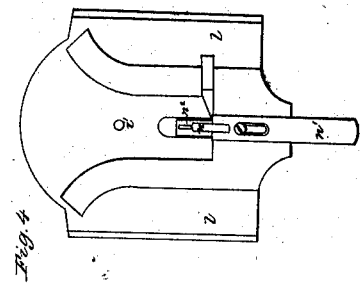
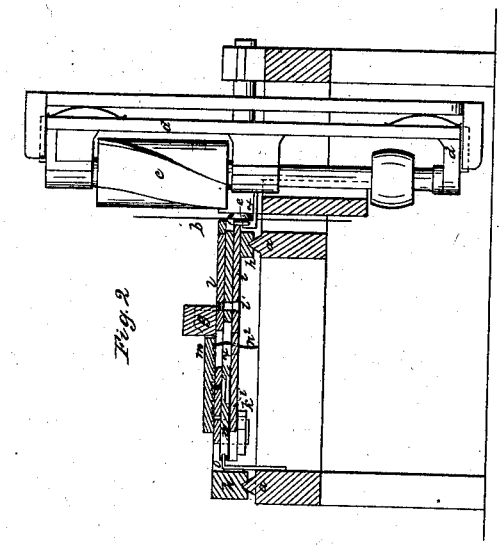
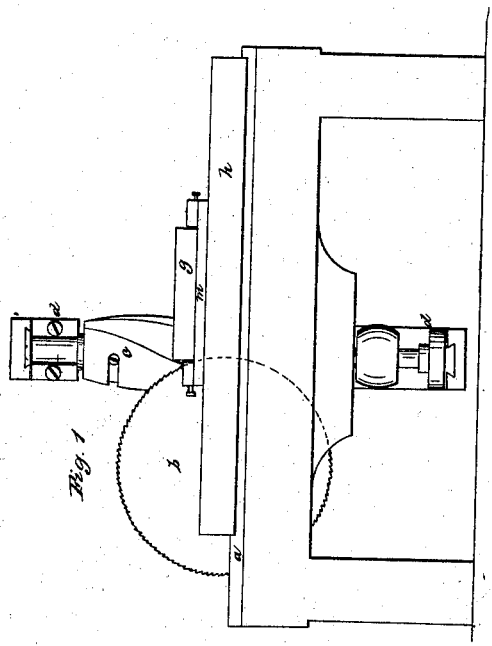
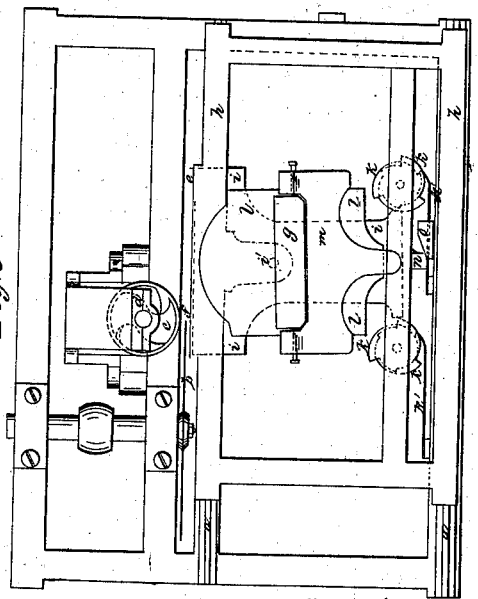
Inventor:
G. H. Mallary

UNITED STATES PATENT OFFICE.

G. H. MALLARY, OF NEW YORK, N. Y.

SHINGLE-MACHINE.

Specification of Letters Patent No. 17,104, dated April 21, 1857.

*To all whom it may concern:*

Be it known that I, G. H. MALLARY, of the city, county, and State of New York, have invented certain new and useful Improvements in Machinery for Sawing and Planing Shingles; and I do hereby declare the following to be a full, clear, and exact description thereof, reference being had to the accompanying drawing, in which—

Figure 1, is a rear elevation; Fig. 2, a section. Fig. 3 is a plan; Fig. 4 the underside of the feeding apparatus.

My improvements are for the purpose of simplifying the working parts of the apparatus and causing more accuracy and durability therein, and in so arranging and combining a saw and cutter as to properly operate upon the shingle at the same time, the cutter or plane being made to vibrate so as to plane the shingle while sawing to the usual taper.

The construction is as follows: On suitable ways or rails $a$ the carriage runs. These rails $a$ are connected with sufficient framework to support them and the saw and plane hereafter described. The saw $b$ is an ordinary circular saw of any kind known in the market, and runs in the most approved way for shingle sawing. Just in front of the saw $b$ a little beyond the point where the saw cuts there is stationed a cylindrical cutter $c$ in a vertical position so as to work in the same plane as the saw, or rather in a plane at a sufficient angle thereto to plane the taper. This cutter is hung in a frame $d$ that is made to slide in a right line to and from the line of the saw cut. This frame is most clearly seen in Fig. 2. This frame is regulated in its distance from the cut by the corner piece $e$ on the sliding carriage embraced by the guide bar $f$ affixed to the sliding carriage or frame $d$ by which the movement of the frame $d$ is made.

The carriage upon which the bolt $g$ to be sawed rests is made as follows: A framework of oblong form $h, h,$ runs on the rails made therefor back and forth past the carriage. Upon this there is a plate $i, i, i,$ pivoted at $i'$. This has a short vibration from side to side regulated by the two cam wheels $k$ affixed to the frame $h$ which bear against the rear end of the vibrating plate $i$ on each side as shown by the dotted lines on Fig. 3. These two cam wheels $k$ are turned by spring catches $k'$ on the stationary part of the machine against which they strike when the carriage runs back and both are thus turned at once. This arrangement moves and holds the vibrating plate $i$ first on one side and then the other which serves to form the taper on the shingle. Upon this plate $i$ there is affixed sliding ways $i$. Above these the slide plate $m$ is put and moves in a line at right angles to the carriage or up toward the saw. On the last named plate $m$ are fixtures to dog the bolt in place, and on the underside there is a rack (seen in Fig. 2) into which a pawl $n$ works. This pawl is attached to a rod or slide $n'$ that as the carriage runs back strikes a stationary cam on the frame at $o$ and the slide plate $m$ is thus driven forward. A spring returns the pawl back; the pawl is released by a rod attached at $n^2$ below. It will be noticed at each advance of the bolt it is rocked to one side and then is properly presented to the saw. Instead of the two cam wheels $k$ one only may be employed at the center striking on each side against a fork or pin. This is so obvious a change that no further description is necessary. It dispenses with one cam wheel and one spring $k'$.

I do not claim any of the separate parts composing this machine when employed by themselves, but What I do claim is—

The arrangement of the several devices herein described by which the bolt is sawed into shingles and planed as herein set forth the whole being combined and constructed substantially as above specified.

G. H. MALLARY.

Witnesses:
WM. P. CHAMBERS,
PETER STARR.